US012076686B2

(12) United States Patent
Inge et al.

(10) Patent No.: US 12,076,686 B2
(45) Date of Patent: Sep. 3, 2024

(54) METHOD AND APPARATUS FOR CLEANING AN AIR FLOW FROM PARTICLES

(71) Applicant: GRIMALDI DEVELOPMENT AB, Nacka Strand (SE)

(72) Inventors: Claes Inge, Nacka (SE); Peter Franzén, Bandhagen (SE); Carl Petrus Häggmark, Täby (SE)

(73) Assignee: GRIMALDI DEVELOPMENT AB, Nacka Strand (SE)

( * ) Notice: Subject to any disclaimer, the term of this patent is extended or adjusted under 35 U.S.C. 154(b) by 245 days.

(21) Appl. No.: 17/434,785

(22) PCT Filed: Mar. 4, 2020

(86) PCT No.: PCT/SE2020/050238
§ 371 (c)(1),
(2) Date: Aug. 30, 2021

(87) PCT Pub. No.: WO2020/180236
PCT Pub. Date: Sep. 10, 2020

(65) Prior Publication Data
US 2022/0134273 A1 May 5, 2022

(30) Foreign Application Priority Data
Mar. 5, 2019 (SE) .................................. 1930079-7

(51) Int. Cl.
*B01D 50/40* (2022.01)
*B01D 45/14* (2006.01)
(Continued)

(52) U.S. Cl.
CPC ............. *B01D 50/40* (2022.01); *B01D 45/14* (2013.01); *B01D 47/066* (2013.01); *B03C 3/017* (2013.01); *B04B 5/12* (2013.01); *B04B 2005/125* (2013.01)

(58) Field of Classification Search
CPC ...... B01D 50/40; B01D 45/14; B01D 47/066; B01D 2247/101; B01D 2247/104;
(Continued)

(56) References Cited

U.S. PATENT DOCUMENTS 2,551,890 A * 5/1951 Love .................... B01D 47/025
55/455
3,710,554 A * 1/1973 Brookman ............. B01D 47/06
55/460

(Continued)

FOREIGN PATENT DOCUMENTS

CN 1712105 A 12/2005
CN 102099120 A 6/2011
(Continued)

OTHER PUBLICATIONS

"Development and Design of Jiahuang Products", p. 188, edited by ZongJingrui, Beijing Polytechnic University Press, Aug. 31, 1993.

*Primary Examiner* — Dung H Bui

(57) ABSTRACT

Method and apparatus for cleaning an air flow from particles, such as bacteria and other microorganisms. According to the invention, an aerosol of liquid droplets is generated in the air flow, whereafter the liquid droplets and the air flow are mixed and the droplets and particles are centrifugally separated from the air flow.

10 Claims, 1 Drawing Sheet

(51) Int. Cl.
 *B01D 47/06* (2006.01)
 *B03C 3/017* (2006.01)
 *B04B 5/12* (2006.01)
(58) Field of Classification Search
 CPC .. B01D 2247/106; B01D 47/06; B03C 3/017;
   B04B 5/12; B04B 2005/125; A61L 9/14
 See application file for complete search history.

(56) References Cited

U.S. PATENT DOCUMENTS

| | | | |
|---|---|---|---|
| 4,015,958 | A | 4/1977 | Leschonski et al. |
| 4,624,688 | A | 11/1986 | Vatunen |
| 6,969,487 | B1* | 11/2005 | Sias ................... A61L 2/14<br>422/4 |
| 8,470,080 | B1* | 6/2013 | Ball, IV ............ B01D 21/2405<br>95/24 |
| 8,627,848 | B2* | 1/2014 | Bambara ............ B01D 19/0042<br>55/440 |
| 9,789,429 | B2* | 10/2017 | Schook .................. B01D 46/10 |
| 2003/0089240 | A1* | 5/2003 | Price ..................... B01D 50/60<br>96/236 |
| 2003/0233932 | A1* | 12/2003 | Ekeroth ................ B01D 45/14<br>96/417 |
| 2005/0060970 | A1* | 3/2005 | Polderman ............. B01D 45/16<br>55/320 |
| 2007/0051245 | A1 | 3/2007 | Yun |
| 2008/0168753 | A1* | 7/2008 | Christiansen .......... B01D 45/16<br>55/440 |
| 2008/0290532 | A1* | 11/2008 | Kooijman .............. B01D 1/305<br>261/108 |
| 2016/0082378 | A1* | 3/2016 | Ishida .................... B04B 5/005<br>55/403 |
| 2019/0151885 | A1* | 5/2019 | Hayashi .................. F02B 33/40 |
| 2019/0358646 | A1* | 11/2019 | Hosseinifar ............. B03C 3/017 |
| 2020/0078302 | A1* | 3/2020 | Manford .............. A61K 9/0075 |

FOREIGN PATENT DOCUMENTS

| | | |
|---|---|---|
| CN | 102834593 A | 12/2012 |
| EP | 11183271.3 | 3/2013 |
| GB | 1553026 | 9/1979 |
| JP | 2016-064329 | 4/2016 |
| KR | 20040099193 A | 11/2004 |
| KR | 2006-0102535 | 9/2006 |
| KR | 100716903 | 5/2007 |
| KR | 2021-0122883 | 11/2012 |
| KR | 101223903 | 1/2013 |

* cited by examiner

METHOD AND APPARATUS FOR CLEANING AN AIR FLOW FROM PARTICLES

FIELD OF THE INVENTION

This invention relates to a method and apparatus for cleaning an air flow from particles.

BACKGROUND OF THE INVENTION

For example, during surgical operations, it is important to keep the air around surgical wounds free of harmful particles such as infectious bacteria and other microorganisms. Although air in operating rooms is cleaned with effective filters, it is not always free of these harmful particles. There is therefore a need to provide even cleaner air in medical and other areas of use.

SUMMARY OF THE INVENTION

It is an object of the invention to provide a method and apparatus which is capable of effectively cleaning air from particles, especially microorganisms and, in particular, bacteria.

According to one aspect of the invention, the method has the following steps:
generating an aerosol of liquid droplets in the air flow,
mixing the aerosol and the air flow,
separating centrifugally the droplets and particles from the air flow, and
supplying the cleaned air flow to an uncleaned area of use.

The mixing of the liquid droplets and the air flow causes at least a portion of the particles to be trapped or agglomerated with the liquid droplets so that they are already separated from the air at this stage. This makes small particles separable in the separating step.

The centrifugal separation separates the droplets and at least relatively large residual non-agglomerated particles including bacteria from the air. The centrifugal separation also generates the necessary airflow with its inherent suction effect.

The aerosol can be generated by vibration of a liquid volume in contact with the air flow. E.g. a piezoelectric vibration generator/nebulizer can then be submerged below the liquid volume at the bottom of a mixing chamber.

The aerosol may also be generated by one or more nozzles, such as different types of aerosol-forming spray nozzles.

Although the mixing occurs to some extent naturally when the air flow entrains the liquid droplets, it can also be produced by creation of turbulence, e.g. by passing the flow around a screen in the mixing chamber.

The particles and the liquid droplets can be made to encounter oblique surface elements during the centrifugal separation. The particles and droplets can then be collected into larger agglomerates securely separated from the air. The growing agglomerates are influenced by the centrifugal force and are thrown away from the surface elements against an inner wall of the mixing chamber, from which they can flow down to the liquid volume by gravity.

The particles can also be attracted to the liquid droplets. This can be accomplished in various ways known per se. For example, viruses and bacteria are naturally charged so that they are attracted to bipolar liquids like e.g. water. The particles in the air to be purified can also be electrostatically charged so that they are attracted to bipolar molecules in the liquid. It is also possible to charge the liquid/liquid droplets.

The field of use may be a medical surgical area, such as a surgical wound. The purified air can then be flushed over the area to keep it free from microorganisms. Many other applications where clean air is needed, such as fume cupboards and manufacturing processes, are also conceivable.

The liquid in the liquid volume may comprise medically approved water or oil, possibly with addition of agents toxic to bacteria or virus.

An apparatus according to the invention comprises
a centrifugal separator,
a mixing chamber communicating with a suction inlet of the centrifugal separator,
an aerosol generator at a bottom of the mixing chamber for generating an aerosol of droplets therein;
an inlet for unclean air to the mixing chamber between the centrifugal separator and the liquid volume;
an outlet for clean air from the centrifugal separator.

Other features and advantages of the invention may be apparent from the claims and the following detailed description.

DETAILED DESCRIPTION

Figure 1:
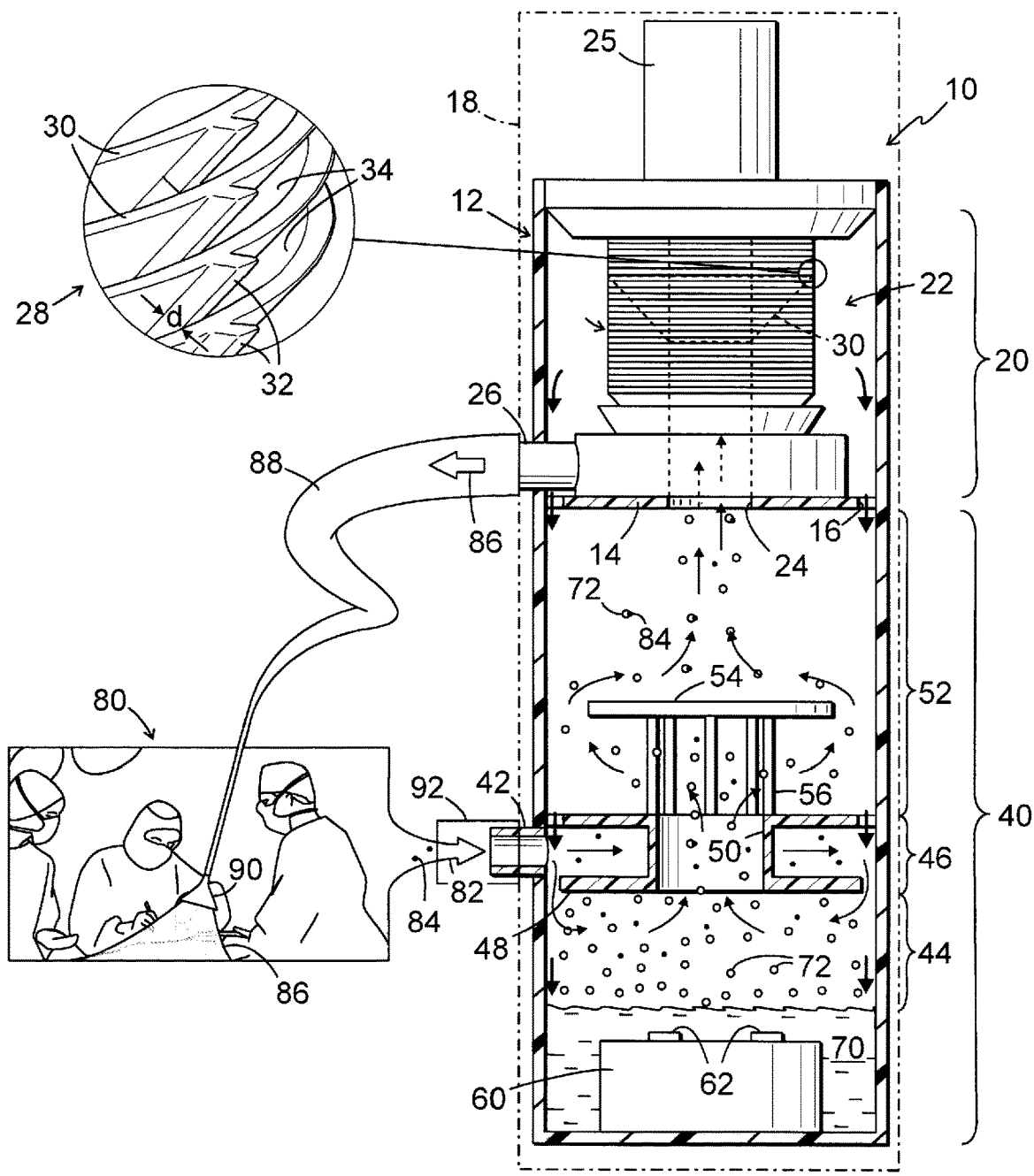
FIG. 1 is a lateral view, partly in section, showing an apparatus according to the invention in operation at a diagrammatically illustrated application area/area of use.

The apparatus shown in FIG. 1 comprises a vertically oriented closed circular cylindrical housing or casing 12. The housing 12 can be considered to be axially divided into an upper separation chamber 20 and a lower mixing chamber 40 via a partition wall 14.

In the separation chamber 20, a centrifugal separator 22 is centrally mounted, which is driven by an electric motor 25 at the top of the housing 12. The centrifugal separator 22 has a lower central inlet 24, which opens into the mixing chamber 40, and a radial or tangential outlet 26 extending out of the housing 12. The centrifugal separator 22 further has a rotor 28 including a pack of stacked frusto-conical surface elements 30.

As diagrammatically shown in the enlarged area of FIG. 1, the surface elements 30 are kept at mutually small distances d by means of suitable spacer elements 32, e.g. in the form of radial flanges formed on the surface elements 30. When the centrifugal separator 22 is in operation, particles suspended in the air and liquid droplets, drawn in from the mixing chamber 40 through the inlet 24 and centrally through the separator, will accumulate and agglomerate on the inner faces 34 of the surface elements 30, which will be described more in the following.

In the bottom of the mixing chamber 40, a vibration generator 60 is immersed in a liquid volume 70 which may be water or any suitable germicidal liquid solution. By varying the surface tension and the viscosity of the liquid a suitable drop size distribution can be achieved. The vibration generator 60, which may be of known e.g. piezoelectric type, has vibrating elements 62 positioned at a suitable distance below the surface of the liquid volume to generate an aerosol or mist of liquid droplets in air in a premix chamber 44 above the surface.

Figure 2:
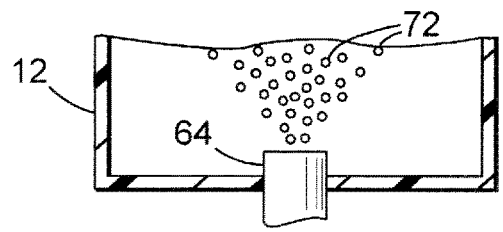
FIG. 2 is a broken-away view corresponding to FIG. 1 showing a bottom portion of a modified apparatus according to the invention.

As Illustrated in FIG. 2, it is also possible to generate an aerosol with one or more suitable spray nozzles 64.

Air 82 to be cleaned by the apparatus is drawn during the operation of the centrifugal separator 22 into the mixing chamber 40 through a radial or tangential inlet 42 above the premix chamber 44. Attached at the height of the inlet 42 is an annular inlet chamber 46 having a lower annular wall 48, at the inlet 42 extending radially spaced from the inside of the cylindrical casing 12 so that the air 82 drawn into the inlet chamber 46 enters the premix chamber 44 around the inside of the casing 12. The air 82 and particles 84 in the air, such as bacteria and viruses, are premixed there with the liquid droplets 72. The premix of uncleaned air 82, particles 84 and suspended liquid droplets 72 is then drawn into a postmix chamber 52 through a central axial passage 50 defined by the walls of the inlet chamber 46.

The postmix chamber 52 has, above the passage 50, a turbulence-generating means 54, for example in the shape of a circular screen forcing the flow of the premix to deviate radially outwardly and accelerate through a narrow passage and creating turbulence upon passage of the screen 54 so as to be subsequently mixed before the flow is drawn into the inlet 24 of the separator 22. The screen or barrier 54 may be supported at a distance above the inlet chamber 46 by means of a concentric ring of support legs 56, which also create turbulence and extend from the top of the inlet chamber 46.

The premix and postmix of the air and liquid droplets form a thick or dense fog that causes the particles in the air to be effectively absorbed and entrained in the flow toward the centrifugal separator 22.

The droplets of the flow drawn centrally into the centrifugal separator 22 are caused by centrifugal force to strike the inclined inner surfaces 34 of the surface elements 30. The solid and liquid phases of the flow, i.e. the particles 84 not already captured by the liquid droplets 72 and the liquid droplets 72 having trapped particles 84, adhere and agglomerate at the inner surfaces 34 until they are big enough to be centrifugally forced radially out of the gaps between the surface element 30 of the rotor 28 and encounter the inner wall of the housing 12. The lighter air 86, which is purified from these phases, is forced in known manner, for example by the fan action of the disc stack in the separator housing, with overpressure through the outlet 26 of the separator 22. The agglomerate which strikes the inside of the housing 12 can flow by gravity down the inner surface of casing 12 through openings 16 in existing partitions, such as partition wall 14, between the chambers, as indicated by the thicker arrows in FIG. 1, until it is returned to the liquid volume 70 at the bottom of the housing 12.

In FIG. 1, also an area of use for the apparatus according to the invention is shown diagrammatically. The air 82 to be cleaned in this case is air from a medical operating room 80 and the purified air 86 is used to continuously purge an operating area, such as an operating wound, via a nozzle outlet tube 86, to keep it free of harmful particles, especially microorganisms, such as bacteria and viruses. A diagrammatically shown inlet hose 92 may be used to draw air from the operating room 80. The apparatus 10 may further be enclosed in a closed, easily sterilizable smooth outer shell 18, and the hoses 88, 92 including any accessories such as an outlet nozzle 90 may be of a disposable or reusable type and provided sterilized in closed plastic bags.

The foregoing detailed description is given primarily for clearness of understanding and no unnecessary limitations are to be understood therefrom. Modifications will become obvious to those skilled in the art upon reading this disclosure and may be made without departing from the spirit of the invention or the scope of the appended claims.

The invention claimed is:

1. An apparatus for cleaning an air flow from particles comprising:
   a centrifugal separator (22);
   a mixing chamber (40) communicating with a suction inlet (24) of the centrifugal separator (22);
   a plurality of spaced-apart surfaces (34) in the centrifugal separator (22) for trapping and agglomerating liquid droplets and particles separated from the air flow;
   an aerosol generator at a bottom portion of the mixing chamber for generating an aerosol of liquid droplets in contact with air flow therein;
   an inlet (42) for unclean air (82) to the mixing chamber (40) between the centrifugal separator (22) and said bottom portion;
   an inlet chamber (46) at the inlet (42) for dividing the mixing chamber (40) into a lower premix chamber (44) and an upper postmix chamber (52),
   said inlet chamber (46) being annular with a central passage (50) for fluid communication between the premix chamber (44) and the postmix chamber (52);
   an outlet (26) for clean air (86) from the centrifugal separator (22); and
   wherein said aerosol generator comprises a vibration generator (60) for generating the aerosol of droplets from a liquid volume (70) occupied in said bottom portion.

2. The apparatus according to claim 1, wherein said aerosol generator comprises an aerosol-forming spray nozzle (64).

3. The apparatus of claim 1, comprising a centrally disposed screen (54) between the central passage (50) and the suction inlet (24) of the centrifugal separator (22).

4. A method of use of the apparatus of claim 1, for cleaning an air flow from particles, comprising the steps of:
   generating an aerosol of liquid droplets in contact with the air flow;
   mixing the aerosol and the air flow;
   separating centrifugally the droplets and particles from the air flow; and
   supplying the cleaned air flow to an uncleaned area of use.

5. The method of claim 4, wherein the mixing comprises creation of turbulence.

6. The method of claim 4, wherein the particles and the liquid droplets are caused to hit oblique surface elements during the centrifugal separation.

7. The method of claim 4, wherein the particles are attracted to the liquid droplets by electrostatic charge.

8. The method of claim 4, comprising selecting the liquid in the droplets from a group comprising medically approved water and oil.

9. The method of claim 8, comprising adding agents toxic to bacteria or virus in the liquid.

10. The method of claim 4, wherein the aerosol is generated by one or more nozzles.

* * * * *